Patented Sept. 11, 1951

2,567,584

UNITED STATES PATENT OFFICE 2,567,584

COLLOIDAL IODINE PREPARATION AND METHOD OF MAKING THE SAME

Charles C. H. Thomas, Pittsburgh, Pa.

No Drawing. Application March 14, 1949,
Serial No. 81,396

8 Claims. (Cl. 167—70)

This invention relates to iodine preparations, and more particularly is for a colloidal iodine preparation and method of making the same.

Although the medicinal, therapeutic and sterilizing properties of iodine are well known, satisfactory preparations for using it in safe, stable and effective forms have heretofore been unavailable. A most common form is the familiar tincture of iodine in which the iodine is dissolved in alcohol. This is a highly toxic preparation, its use in open wounds and abrasions is painful and injurious to tissues, and evaporation of the alcohol which occurs when the bottle is not tightly corked causes the solution to reach a concentration such as to be quite injurious. An additional disadvantage of this solution is that when the solution is applied to a wound, the alcohol evaporates, leaving a concentrated deposit of tiny crystals of the highly caustic iodine.

In other forms of preparations the iodine may be in chemical combination where it is less effective.

It has also been attempted to make effective salve preparations using greasy ingredients or compounds of the fatty acids. Such salves, by reason of the unsaturated nature of the fatty compounds, react with the iodine to reduce its effectiveness, and because of their greasy, oily character, these preparations stain garments, bedclothing, penetrating any bandages which may be used, without providing the therapeutic properties ascribed to them. Oils and greases, moreover, prevent or retard penetration of the iodine into the skin; interfere with proper aeration of the wound, and tend to interfere with desirable scab formation.

Iodine in colloidal form is recognized to be particularly effective, but no stable composition containing it has heretofore been available, the iodine tending eventually to settle.

The present invention provides an easily spreadable unguent iodine preparation in which the iodine in colloidal condition remains stable and is in an uncombined or pure state, and a method of making it. The invention further provides a composition in which the concentration of iodine may be accurately maintained in effective but non-caustic percentages. If exposed to air, it may gradually lose its iodine by sublimation over long periods of time, but the concentration of iodine cannot increase, as with tincture of iodine.

Further, the invention provides a soft, smooth, colloidal iodine-carrying salve in which the vehicle is inert with respect to the iodine, non-greasy, removable with water, and quick drying when applied to the skin or body tissues. It may be applied to cuts, wounds and abrasions without pain. The product may be dried for use in tablets, or for incorporation into animal or poultry feeds, but primarily it has, as desired, a salve-like consistency, or may be used in a semi-fluid state.

According to my invention a gel or magma is formed by the use of an inorganic mineral gel such as aluminum silicate. Also a suspension of colloidal iodine in water is prepared, any well known protective colloid known to the art, such as acacia, being used. The amount of protective colloid will vary, but ordinarily is of the order of 1 to 4%. This colloidal suspension of iodine is then introduced in the mineral gel or magma to provide my novel preparation.

The inorganic mineral gel used as a base for my product is chemically inert with respect to the iodine. It holds the iodine in suspension and forms an inert diluent. The gel does not interfere with absorption of the iodine into the skin, or with aeration of the wound. Such a gel may be spread as a thin film over the skin and will tend to keep the iodine in contact with the skin, and yet it is a porous film favorable, as indicated, to desirable aeration of the wound or other surface.

Inorganic mineral gels formed by mixing a substance, such as bentonite or hydrated aluminum silicate and water, is promoted by a higher pH, one definitely alkaline. The colloidal suspension of iodine in water is of the order of pH 7 or slightly lower, and if it were to be introduced directly into the hydrated aluminum silicate, gel formation is inhibited. I have discovered that if the gel is first prepared, using first water and hydrated aluminum silicate, and the iodine-water suspension then mixed with it, the gel will not be disturbed and the resulting mix will be stable; settling or separation will not take place, and even with freezing and thawing the product will be stable, and the iodine will not crystallize.

Without the formation of the gel, there would result simply a paste which might be hard and dry and difficult to spread, or a mixture in which the earthen material would settle, leaving the water at the top.

In preparing the base material, the bentonite and water may be used in such proportions as to produce a product of smooth ointment-like consistency, or more water may be used to produce a less firm gel or magma. The term "gel"

as used herein comprehends either forms, i. e., the product of ointment or salve-like consistency, and the more fluid product or magma.

Typical examples of my invention are as follows:

Example I

Bentonite (hydrated aluminum silicate) and water are mixed in the proportion of 100 parts by weight of bentonite to 498.5 parts by weight of water to produce a gel. To this gel there is then added and mixed 112.8 parts by weight of an aqueous suspension of colloidal iodine carrying 10% by weight of iodine (10% aqueous suspensoid).

This composition produces a smooth, salve-like preparation with an iodine content of 1.88% based upon the total amount of water. I have here described a 10% suspensoid of colloidal iodine. However, this may be varied widely, as in all other examples, but a suspensoid is more easily diffused through the gel; and a 20% suspensoid could be used as well as a 10%, adjustment being made in the amount of water used in preparing the gel.

Example II

Bentonite and water are mixed in the percentage of 100 parts by weight of bentonite and 292 parts by weight of water. To this is added and mixed 120 parts of an aqueous suspension of colloidal iodine (10% suspensoid). This composition produces a slightly stiffer ointment-like preparation having an iodine content of 3% based upon the amount of water.

Example III

Bentonite, 98 parts by weight, and water 292 parts, are mixed to form a gel. Colloidal iodine (10% aqueous suspension as above) is added and mixed therewith, 120 parts of the aqueous suspension being used. Into the resulting mixture an additive may be introduced, which may or may not be a colloid for possibly retarding loss of iodine as well as water upon aeration. For example, 2 parts by weight of sodium carboxymethylcellulose may be used in the above mix, which produces an ointment or salve-like preparation. Other additives used in about similar amounts may be magnesium oxide, methyl cellulose, acacia in amounts over and above the amount which may be used in the aqueous suspension of iodine as a protective colloid. These are merely typical of additives that may be used. In some cases, as where the mixture is to be subsequently dried, the additive, such as carboxymethylcellulose may be 40 to 60% of the entire mass. For topical use the additives may be less desirable than where the preparation is for internal use or water sterilization as the additive coats the iodine making it less available for penetration into the skin.

Example IV 100 parts by weight of bentonite are mixed with 1400 parts by weight of water forming a semi-liquid gel or magma. To this was added 155 parts by weight of a 10% aqueous suspension of colloidal iodine. This results in a stable, semi-fluid or cream-like magma.

From the foregoing examples, for the making of an ointment or salve-like preparation, a ratio of bentonite to water in the range of 1:4.5 to 1:6.5 is recommended in the final product. However, ratios as high as 1:8 may be used. The percentage of iodine with reference to water may range between ½ to 6% or higher, but for general use, 1% would normally be a good minimum and 4% the maximum. Above 6% of iodine in the salve or magma, a physician's instructions would be desirable. For ordinary use by humans, somewhere around 2% of colloidal iodine is most desirable. This will give highly therapeutic effects and germicidal effects without endangering a too caustic concentration of iodine. However 6% of iodine may be safely used, particularly for veterinary purposes, and as indicated above, even high percentages of iodine may be employed, particularly if the gel is subsequently dried for incorporation into tablets for poultry feed, or for other special uses.

Extended tests show that when exposed to air, the amount of available iodine will decrease, due to loss through sublimation, resulting in a weakening of the iodine concentration, rather than an increase. Even though, upon long exposure, the concentration may be as low as 1%, it will still be highly effective as a germicide.

Upon being frozen to a solid condition, the preparation shows the formation of dark crystals on the surface, but these dispersed upon thawing. This was especially apparent in samples containing 4% of colloidal iodine. The thawed samples had a pasty condition which smoothed readily when mulled gently with a spatula. Apparently freezing did not result in crystallization of the iodine, but free water carrying iodine in suspension froze out of the system.

While a gel may not be prepared by mixing the suspension of iodine and water with the hydrated aluminum silicate because of the low pH factor or acid reaction of the iodine, it does not, as would be suspected, break down a gel which has been formed from the hydrated aluminum silicate and water alone. This is probably due to the fact that both the bentonite and the colloidal iodine are electro-negatively charged, and hence are compatible when the iodine suspension is introduce into the gel.

As indicated above, once the gel has been prepared and the iodine has been introduced into it, it may be partially or completely dehydrated, and the resulting drier mixture can be tableted or introduced into capsules or containers.

The preparation of the present application is stable; crystallization of the iodine does not occur, even when the preparation is subjected to freezing and thawing. The bentonite provides a completely greaseless vehicle, and yet the compound is of an unguent character such that it can be spread like an ointment or salve, or in the form of a magma can be applied with a swab, and it can be used for internal as well as external prophylaxis. The colloidal mineral gel base is also miscible and compatible with the protective colloid medium for the colloidal iodine. While the colloidal iodine is the most effective form for use as a germicide and sterilizing medium, it is the least toxic form from the standpoint of human consumption, and the magma or ointment can be effectively used on the gums of a patient, for example, after the extraction of teeth, particularly where there has been infection, and for the treatment of the gums. It can also be used on open wounds and delicate membranes, without irritation, and the painful stinging that results from the use of tincture of iodine on an open wound is entirely absent when the present ointment is used. As a matter of fact, the preparation appears to have definite analgesic and pain-relieving properties.

When the ointment is spread on body tissue, for example, it may be applied in a very thin, light film, which will dry quickly. The iodine will not then rub off or discolor garments. In other cases, it may be desirable to apply the ointment more freely and then remove the excess with a moist cloth. The latter procedure is particularly recommended in the treatment of a wound where dirt or like foreign impurities are present, as the adsorptive properties of the bentonite will help to remove dirt and foreign matter, particularly when the wound is wiped, after the application of the salve, with a damp cloth. Even though a damp cloth is used, sufficient iodine will remain to be effective in the wound, bruise, or skin.

Instead of using bentonite, equivalent earthen materials capable of producing a gel may be used, as for example certain grades of kaolin and other clays. Bentonite, however, is the preferred type of clay, because of its high adsorptive capacity, and because a bentonite gel, when carefully prepared, is deemed to have some therapeutic value of its own.

The colloidal iodine may be prepared according to any preferred method of procedure. Patent No. 1,866,923 to Wallace L. Chandler, describes in detail one method of preparing colloidal iodine. It may also be prepared in a colloidal mill, or it may be formed by other processes.

While I have shown and described in detail certain specific embodiments of my invention, it will be understood that various changes and modifications are contemplated.

I claim:

1. A composition of matter in which the ingredients do not settle or separate upon standing, comprising a colloidal gel of hydrophilic mineral and water and having a suspension of elemental colloidal iodine and water homogeneously dispersed therethrough.

2. A composition of matter in which the ingredients do not settle or separate upon standing, comprised of a colloidal gel of bentonite and water into which has been homogeneously dispersed a colloidal suspension of elemental iodine and water, said colloidal suspension of elemental iodine including also a protective colloid.

3. A composition of matter in which the ingredients do not settle or separate, and comprised principally of water and containing colloidal mineral and colloidal iodine, said composition comprising a gel in which the mineral and water are combined in a colloidal system, said colloidal system having a suspension of elemental colloidal iodine and water homogeneously dispersed therethrough.

4. An unguent spreadable stable composition of matter in which the ingredients do not separate upon standing, comprising a thick colloidal gel of hydrophilic mineral and water through which there is dispersed a suspension of elemental colloidal iodine and water.

5. The composition of matter defined in claim 1 wherein the hydrophilic mineral is colloidal hydrated aluminum silicate.

6. The herein-described method of making a colloidal iodine-bearing preparation which comprises first mixing water and a gel forming colloidal mineral together and forming a colloidal system of water and such mineral in the form of a gel from which the ingredients do not separate or settle, and then uniformly dispersing through said gel a colloidal suspension of elemental colloidal iodine and water.

7. The method of forming an iodine-carrying viscous body in which the ingredients do not settle, and from which they do not separate upon standing and in which water is the principal ingredient, wherein water and a colloidal hydrophyllic earth are mixed and agitated together to first produce a colloidal system in the form of a gel, and thereafter introducing into said system a second colloidal system in which colloidal elemental iodine is suspended in water and stabilized with a protective colloid and blending the two colloidal systems into a uniform homogeneous mass.

8. The method defined in claim 6 in which the colloidal iodine constitutes between one-half of one per cent and six per cent of the total water.

CHARLES C. H. THOMAS.

REFERENCES CITED

The following references are of record in the file of this patent:

UNITED STATES PATENTS

| Number | Name | Date |
| --- | --- | --- |
| 1,813,109 | Banks | July 7, 1931 |
| 1,925,135 | Chandler | Sept. 5, 1933 |
| 2,464,755 | Taub | Mar. 15, 1949 |

FOREIGN PATENTS

| Number | Country | Date |
| --- | --- | --- |
| 550,584 | Germany | Apr. 28, 1932 |

OTHER REFERENCES

Muhleman Schweizerische Apotheker Leitung, vol. 80 (1942), No. 22 pp. 283 to 286.

Lesser Drug and Cosmetic Industry, vol. 62, June 1948, pp. 750-752.

Conant et al., Abstract of application, Serial Number 612,541, published Sept. 27, 1949, 626 O. G. 1158.